United States Patent
Hatanaka et al.

(10) Patent No.: US 9,964,343 B2
(45) Date of Patent: May 8, 2018

(54) REFRIGERATION CYCLE APPARATUS

(71) Applicant: Mitsubishi Electric Corporation, Tokyo (JP)

(72) Inventors: Kensaku Hatanaka, Tokyo (JP); Kosuke Tanaka, Tokyo (JP); Koji Azuma, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days. days.

(21) Appl. No.: 15/300,347

(22) PCT Filed: Apr. 21, 2014

(86) PCT No.: PCT/JP2014/061210
§ 371 (c)(1),
(2) Date: Sep. 29, 2016

(87) PCT Pub. No.: WO2015/162679
PCT Pub. Date: Oct. 29, 2015

(65) Prior Publication Data
US 2017/0130996 A1    May 11, 2017

(51) Int. Cl.
*F25B 13/00* (2006.01)

(52) U.S. Cl.
CPC ........ *F25B 13/00* (2013.01); *F25B 2313/004* (2013.01); *F25B 2313/006* (2013.01); *F25B 2313/0231* (2013.01); *F25B 2313/0233* (2013.01); *F25B 2313/0253* (2013.01); *F25B 2400/23* (2013.01); *F25B 2600/13* (2013.01)

(58) Field of Classification Search
CPC ..... F25B 29/003; F25B 5/02; F25B 2339/047
See application file for complete search history.

(56) References Cited

U.S. PATENT DOCUMENTS

2006/0005558 A1* 1/2006 Otake .................... F25B 9/008
                                                                62/260
2013/0091877 A1* 4/2013 Cho ...................... F25B 49/027
                                                                62/79

FOREIGN PATENT DOCUMENTS

| JP | 62-288460 A | 12/1987 |
|----|-------------|---------|
| JP | H01-314840 A | 12/1989 |
| JP | 3997482 B | 10/2007 |
| WO | 2011/121634 A1 | 10/2011 |
| WO | 2013/144994 A1 | 10/2013 |

OTHER PUBLICATIONS

Office Action dated Mar. 28, 2017 issued in corresponding JP patent application No. 2016-514573 (and English translation).
International Search Report of the International Searching Authority dated Jul. 8, 2014 for the corresponding international application No. PCT/JP2014/061210 (and English translation).
Office Action dated Oct. 3, 2017 in corresponding JP patent application No. 2016-514573 (and English translation attached).

* cited by examiner

*Primary Examiner* — Cassey D Bauer
(74) *Attorney, Agent, or Firm* — Posz Law Group, PLC (57) ABSTRACT

A flow rate of circulating water to a water heat exchanger is determined by multiplying, by a rated water flow rate, a ratio of an absolute value of a difference between a total operation capacity of each of indoor side heat exchangers serving as a heating load and a total operation capacity of each of indoor side heat exchangers serving as a cooling load to a total operation capacity of the water heat exchanger.

12 Claims, 8 Drawing Sheets

<COOLING ONLY OPERATION MODE>

FIG. 4

<HEATING ONLY OPERATION MODE>

FIG. 5

<COOLING MAIN OPERATION MODE>

FIG. 6

<HEATING MAIN OPERATION MODE>

REFRIGERATION CYCLE APPARATUS

CROSS REFERENCE TO RELATED APPLICATION

This application is a U.S. national stage application of PCT/JP2014/061210 filed on Apr. 21, 2014, the contents of which are incorporated herein by reference.

TECHNICAL FIELD

The present invention relates to a water-cooled refrigeration cycle apparatus capable of a simultaneous cooling and heating operation.

BACKGROUND ART

Examples of conventional refrigeration cycle apparatuses capable of a simultaneous cooling and heating operation include, for example, an air-conditioning apparatus applied to a multi-air-conditioning apparatus for a building, or other purposes. Some of such air-conditioning apparatuses use a water heat exchanger as an outdoor heat exchanger (a heat source side heat exchanger).

As an example of the above configuration, conventionally-proposed structures include "a water-cooled air conditioning apparatus in which a refrigeration cycle is structured by sequentially connecting together, by refrigerant pipes, a capability-variable compressor, a four-way valve, an outdoor side water heat exchanger exchanging heat between refrigerant and cooling water, a pressure reducing device, and an indoor side air heat exchanger equipped with an indoor fan, the water-cooled air conditioning apparatus including a controller configured, when a room temperature detected by a room temperature sensor has reached a level close to a set temperature, to reduce the operating rotation speeds of both the compressor and the indoor fan depending on the temperature difference between the detected room temperature and the set temperature, the water-cooled air conditioning apparatus including a water volume regulating valve configured to control conduction and flows of the cooling water conducted to the outdoor side water heat exchanger, the controller being configured to control the opening degree of the water volume regulating valve corresponding to the operating rotation speeds of the compressor and the indoor fan" (see Patent Literature 1, for example).

Further, another conventionally-proposed structure is "a water heat source air-conditioning system in which a detour pipe is connected to a heat source water circuit to allow communication between the detour pipe and the heat source water circuit, the detour pipe is provided with a flow rate controlling valve, a part of the detour pipe positioned on the upstream side of the flow rate controlling valve is connected to a heat source water inlet path of a water-cooled heat-pump air conditioning apparatus, a part of the detour pipe positioned on the downstream side of the flow rate controlling valve is connected to a heat source water outlet path of the water-cooled heat-pump air conditioning apparatus, an inlet water temperature detector configured to detect the heat source water inlet temperature of the water-cooled heat-pump air conditioning apparatus is provided, and also, an outlet water temperature detector configured to detect the heat source water outlet temperature of the water-cooled heat-pump air conditioning apparatus is provided, a control unit is further provided to adjust capability by increasing or decreasing the volume of the heat source water supplied to the water-cooled heat-pump air conditioning apparatus by controlling the water volume controlling valve on the basis of the heat source water inlet temperature and the heat source water outlet temperature detected by the water temperature detectors, and an open-close valve is provided in the heat source water circuit in a position between the upstream-side connection part and the downstream-side connection part of the detour pipe" (see Patent Literature 2, for example).

CITATION LIST

Patent Literature

Patent Literature 1: Japanese Unexamined Patent Application Publication No. 01-314840
Patent Literature 2: Japanese Patent No. 3997482

SUMMARY OF INVENTION

Technical Problem

In the technique described in Patent Literature 1, the volume of the water supplied to the outdoor unit is adjusted on the basis of the frequency of the compressor in the outdoor unit and the rotation speed of the fan (the indoor fan) in the indoor unit. In this configuration, however, when the simultaneous cooling and heating operation is performed, water may be supplied to the water heat exchanger (the outdoor side water heat exchanger) at a water flow rate higher than necessary, even if such a level of water flow rate is unnecessary in actuality. For this reason, the conventionally-proposed structure has a disadvantage in that the power of the pump cannot be reduced, and therefore energy cannot be saved by reducing the power of the pump.

Further, in the technique described in Patent Literature 2, the volume of water is adjusted on the basis of the heat source water inlet temperature detected by the inlet water temperature detector (15) and the heat source water outlet temperature detected by the outlet water temperature detector (16). In other words, in the configuration described in Patent Literature 2, the temperature difference between the outlet and the inlet has to be controlled on an assumption of the measurement errors of the water temperature sensors. For this reason, when the detection error is ±1 degree C., the target temperature difference is expressed as $\Delta T=5$ degrees C. and a detected temperature difference is supposed to be 5 degrees C. However, the actual temperature difference may be 3 degrees C. or 7 degrees C. In these situations, the flow rate may fall below a lower limit flow rate determined for preventing the water heat exchanger from being frozen, the water heat exchanger may be frozen, and thus the outdoor unit may become out of order. In contrast, when the flow rate is made not to fall below the lower limit flow rate determined for preventing the water heat exchanger from being frozen, the water flow rate cannot be reduced, and the conventionally-proposed structure therefore has a disadvantage in energy saving.

In view of the problems described above, an object of the present invention is to provide a refrigeration cycle apparatus capable of reducing the power of a pump and improving an energy-saving performance, by adjusting the flow rate of circulating water to a water heat exchanger depending on a use-side load such as an indoor load.

Solution to Problem

A refrigeration cycle apparatus according to an embodiment of the present invention includes a refrigerant circuit connecting a compressor, a water heat exchanger, a plurality of pressure reducing devices, and a plurality of use-side heat exchangers, and a water circuit connecting a pump. Each of the plurality of use-side heat exchangers is configured to perform heating operation or cooling operation. A flow rate of circulating water to the water heat exchanger is determined by multiplying, by a rated water flow rate of the pump corresponding to the water heat exchanger, a ratio of an absolute value of a difference between a total operation capacity of each of the use-side heat exchangers executing the heating operation and a total operation capacity of each of the use-side heat exchangers executing the cooling operation to a total operation capacity of the water heat exchanger.

Advantageous Effects of Invention

The refrigeration cycle apparatus according to an embodiment of the present invention is configured to determine the flow rate of the circulating water on the basis of the operating capacities of the water heat exchangers and the operation capacities of the use-side heat exchangers. Consequently, the flow rate of the water supplied to the water heat exchangers can be at a required minimum level. Waste of water can be reduced to improve the energy-saving performance, accordingly.

DESCRIPTION OF EMBODIMENTS

An embodiment of the present invention will be described hereinafter, with reference to the drawings as necessary. In the drawings below including FIG. 1, the relationship among the dimensions of the components may be different from that in actuality. Further, in the drawings below including FIG. 1, some of the components added with the same reference signs either are the same as each other or correspond to each other. The reference signs are common in the whole description of the present invention. Further, the shapes of the components described in the description are merely examples, and the present invention is not limited to the described shapes.

Figure 1:
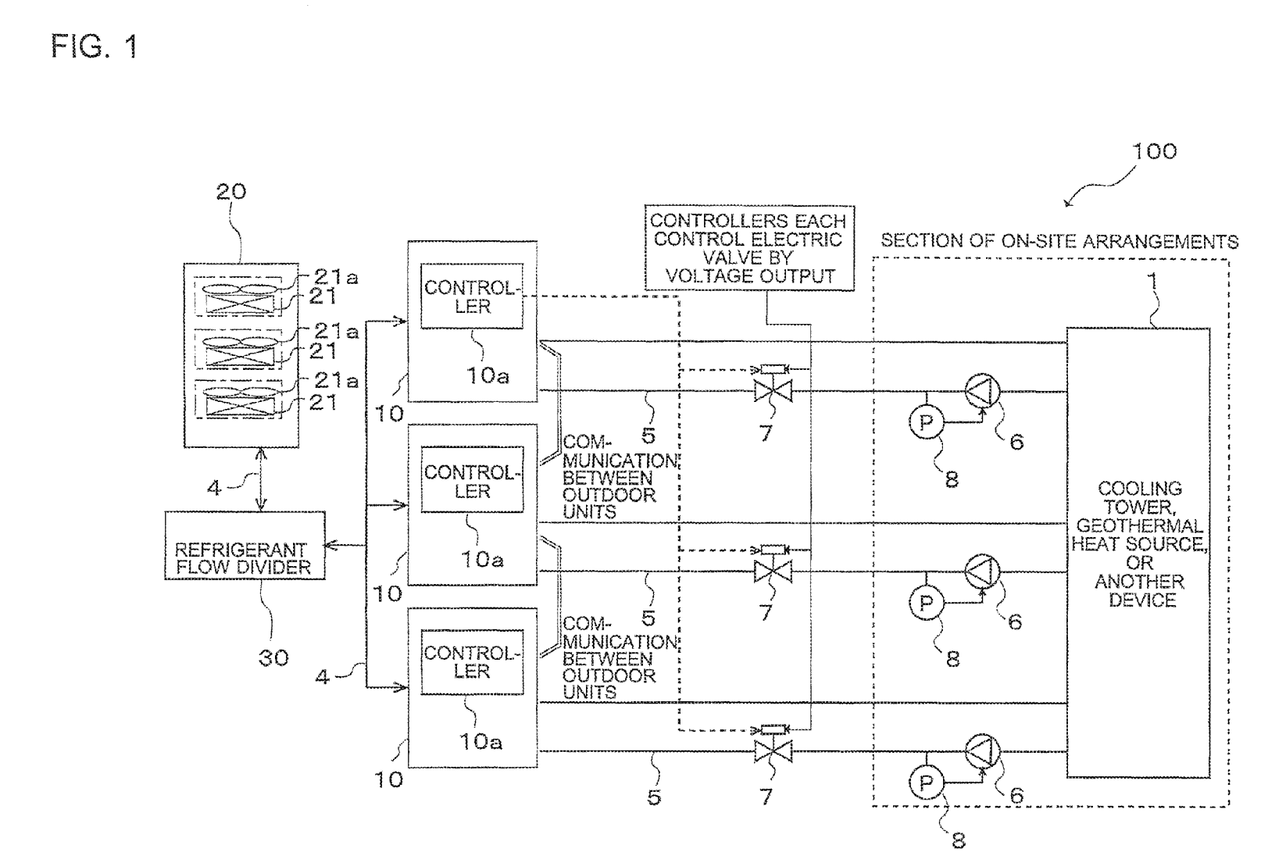
FIG. 1 is a system configuration diagram schematically illustrating an example of a system configuration of a refrigeration cycle apparatus according to an embodiment of the present invention.
Figure 2:
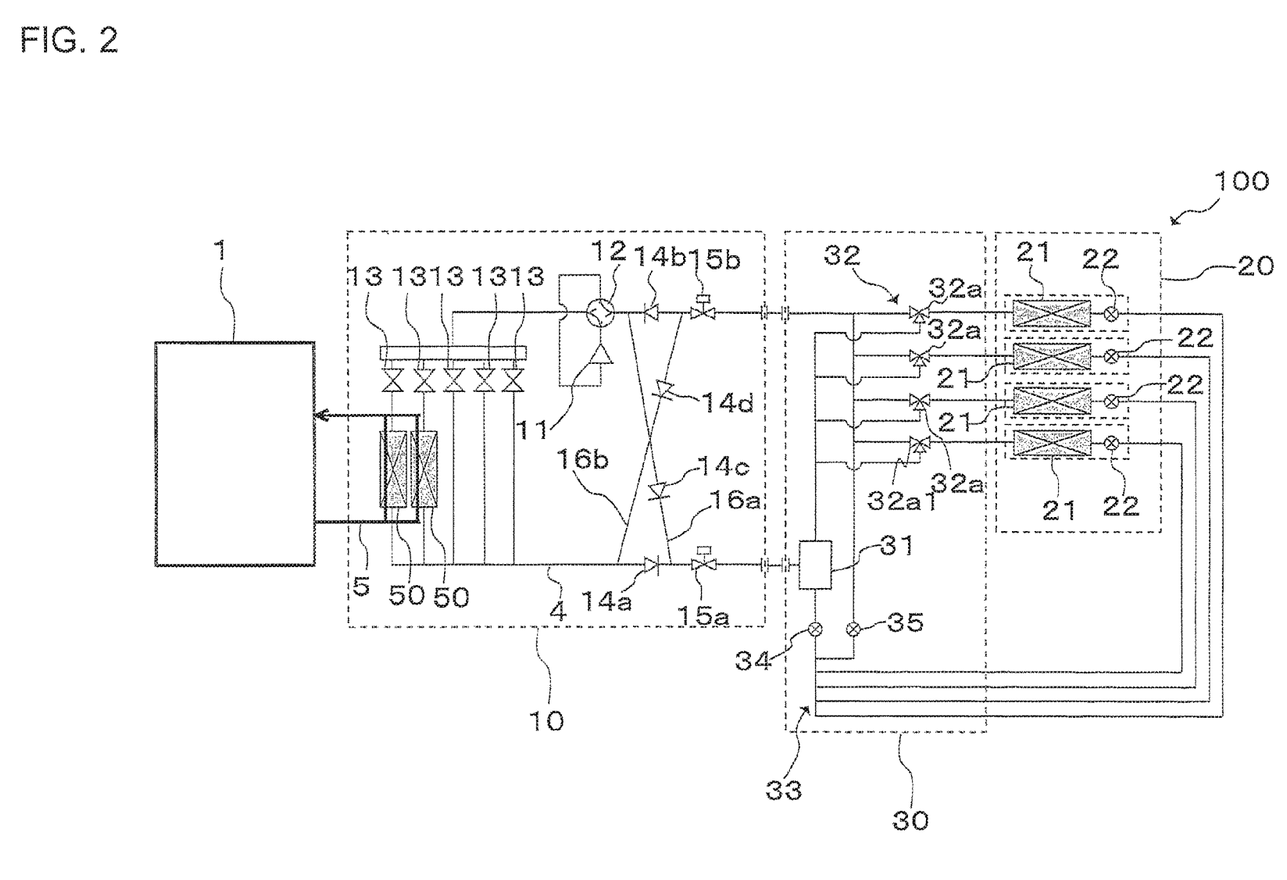
FIG. 2 is a circuit configuration diagram schematically illustrating an example of a configuration of a refrigerant circuit of the refrigeration cycle apparatus according to the embodiment of the present invention.

FIG. 1 is a system configuration diagram schematically illustrating an example of a system configuration of a refrigeration cycle apparatus (hereinafter, "refrigeration cycle apparatus 100") according to the embodiment of the present invention. FIG. 2 is a circuit configuration diagram schematically illustrating an example of a configuration of a refrigerant circuit of the refrigeration cycle apparatus 100. The refrigeration cycle apparatus 100 will be explained with reference to FIGS. 1 and 2.

For example, the refrigeration cycle apparatus 100 is applied as an air-conditioning apparatus capable of a simultaneous cooling and heating operation, such as a multi-air-conditioning apparatus for a building. The refrigeration cycle apparatus 100 uses a water heat exchanger as an outdoor heat exchanger (a heat source side heat exchanger). The refrigeration cycle apparatus 100 includes at least one outdoor unit 10, a plurality of indoor units 20, and a refrigerant flow divider 30 interposed between the outdoor unit 10 and the indoor units 20. The outdoor unit 10 and the refrigerant flow divider 30 are connected to each other via a refrigerant pipe 4. Further, the indoor units 20 and the refrigerant flow divider 30 are also connected to each other via a refrigerant pipe 4.

<The Outdoor Unit 10>

The outdoor unit 10 has a function of supplying either heating energy or cooling energy to the indoor units 20 via the refrigerant flow divider 30. The refrigeration cycle apparatus 100 is only required to include at least one outdoor unit 10; however, as illustrated in FIG. 1, three outdoor units 10 may be connected to the refrigerant flow divider 30 in parallel. In this configuration, the respective controllers 10a are preferably connected to each another in a wired or wireless manner so that the outdoor units 10 can communicate with each another.

Further, each of the outdoor units 10 includes the following components connected in series: a compressor 11, a four-way valve 12 serving as a flow switching unit, solenoid valves 13, and water heat exchangers 50 serving as heat source side heat exchangers.

The compressor 11 is configured to suck refrigerant and to compress the refrigerant into a high temperature and high pressure state.

The four-way valve 12 is provided on the discharge side of the compressor 11 and is configured to switch the flow of the refrigerant.

The solenoid valves 13 are provided in the refrigerant pipes 4 positioned between the compressor 11 and the water heat exchangers 50 and are each configured to open and close the refrigerant pipes 4. To adjust the heat transfer area of the water heat exchangers 50, two or more solenoid valves 13 are provided.

Each of the water heat exchangers 50 acts as an evaporator or a radiator (a condenser) and is configured to evaporate and gasify the refrigerant or to condense and liquefy the refrigerant, by exchanging heat between water (or brine) supplied from the heat source device 1 and the refrigerant. In other words, each of the water heat exchangers 50 is connected with corresponding ones of the refrigerant pipes 4 and water pipes 5 used for supplying the water and is configured to exchange heat between the refrigerant flowing through the refrigerant pipe 4 and the water flowing through the water pipe 5.

A stop valve 15a and a stop valve 15b are provided in the refrigerant pipes 4 connecting the outdoor units 10 and the refrigerant flow divider 30 to each other. The outdoor units 10 and the refrigerant flow divider 30 can be disconnected from each other at positions of the stop valve 15a and the stop valve 15b.

Further, each of the outdoor units 10 includes the controller 10a configured to integrally control the refrigeration cycle apparatus 100. The controller 10a may be composed of hardware such as a circuit device having the integral control function or may be composed of an arithmetic device such as a microcomputer and a central processing unit (CPU), and software executed on the arithmetic device.

The controller 10a is configured to control the rotation speed of a corresponding one of pumps 6 and opening-closing operations of a corresponding one of electric valves 7, on the basis of a detected value from a corresponding one of pressure sensors 8 installed in the heat source device 1 (explained later). As illustrated in FIG. 1, each of the controllers 10a controls the driving of a corresponding one of the electric valves 7 by a voltage output. Further, each of the controllers 10a is configured to control the driving frequency of the compressor 11, the switching of the four-way valve 12, and the opening-closing operations of the solenoid valves 13.

Further, each of the outdoor units 10 includes a check valve 14a allowing the refrigerant to flow only in a predetermined direction (the direction from the outdoor unit 10 to the refrigerant flow divider 30) and provided in the refrigerant pipe 4 positioned between the water heat exchangers 50 and the refrigerant flow divider 30, and a check valve 14b allowing the refrigerant to flow only in another predetermined direction (the direction from the refrigerant flow divider 30 to the outdoor unit 10) and provided in the refrigerant pipe 4 positioned between the four-way valve 12 and the refrigerant flow divider 30.

Further, each of the outdoor units 10 includes a first connecting pipe 16a connecting the refrigerant pipe 4 positioned on the downstream side of the check valve 14a and the refrigerant pipe 4 positioned on the downstream side of the check valve 14b, and a second connecting pipe 16b connecting the refrigerant pipe 4 positioned on the upstream side of the check valve 14a and the refrigerant pipe 4 positioned on the upstream side of the check valve 14b. The first connecting pipe 16a is provided with a check valve 14c allowing the refrigerant to flow only in the direction from the downstream side of the check valve 14b to the downstream side of the check valve 14a. The second connecting pipe 16b is provided with a check valve 14d allowing the refrigerant to flow only in the direction from the upstream side of the check valve 14b to the upstream side of the check valve 14a.

Regardless of requests from the indoor unit 20, the flow of the refrigerant into the refrigerant flow divider 30 can be arranged in a certain direction, by providing the check valve 14a, the check valve 14b, the check valve 14c, the check valve 14, the first connecting pipe 16a, and the second connecting pipe 16b.

<The Heat Source Device 1>

The heat source device 1 has a function of supplying a hear source to each of the outdoor units 10 via the water heat exchangers 50. The heat source device 1 is composed of, for example, a cooling tower, a geothermal heat source, or a water tank and is configured to supply the water to the water heat exchangers 50 in each of the outdoor units 10 as a heat medium. In other words, the heat source device 1 is connected to each of the outdoor units 10 by a corresponding one of the water pipes 5.

On each of the water pipes 5, a corresponding one of the pumps 6, a corresponding one of the electric valves 7, and a corresponding one of the pressure sensors 8 are installed.

For example, each of the pumps 6 is configured to suck the water stored in the heat source device 1, to apply pressure to the sucked water, and to cause the pressured water to circulate through the water pipe 5. Each of the pumps 6 is of a type of which the rotation speed can be controlled by an inverter. To prevent the water pipes 5 from being frozen, water is constantly supplied to the water heat exchangers 50 by the pumps 6.

Each of the electric valves 7 is configured to open and close a corresponding one of the water pipes 5 and is composed of an electric valve and another component.

Each of the pressure sensors 8 is installed on the downstream side (the discharge side) of a corresponding one of the pumps 6 and is configured to detect the pressure of the water to which pressure is applied by the pump 6.

These components may be installed in a single unit being the heat source device 1 or may be installed on the outside of the heat source device 1, as illustrated in FIG. 1.

Generally speaking, the heat source device 1, the pumps 6, and the pressure sensors 8 are in a section of on-site arrangements when the refrigeration cycle apparatus 100 is actually installed.

Further, the present example illustrates that each of the pressure sensors 8 is installed on the downstream side of a corresponding one of the pumps 6; however, in place of the pressure sensors 8, a flowmeter (a flow rate detecting unit) configured to detect a flow rate of the water flowing in the water pipe 5 may be installed on the downstream side of each of the pumps 6. Alternatively, both the pressure sensor 8 and the flowmeter may be installed on the downstream side of each of the pumps 6.

<The Indoor Units (the Use-Side Units) 20>

Each of the indoor units 20 has a function of receiving either the heating energy or the cooling energy supplied from the outdoor unit 10 and serving as either a heating load (a heating operation) or a cooling load (a cooling operation). For example, each of the indoor units 20 is installed in such a position that the indoor unit 20 can supply either heated air or cooled air to an air-conditioned space such as an indoor space and is configured to perform either a cooling operation or a heating operation on the air-conditioned space. Note that the refrigeration cycle apparatus 100 can perform the simultaneous cooling and heating operation, two or more indoor units 20 are provided, and each of the indoor units 20 (indoor side heat exchangers 21) can serve as either a heating load or a cooling load.

Further, in each of the indoor units 20, an indoor side heat exchanger (the use-side heat exchanger) 21 and a pressure reducing device 22 are installed and connected in series. FIG. 1 illustrates an example in which each of the indoor side heat exchangers 21 is configured to exchange heat between air and the refrigerant. In each of the indoor units 20, an air-sending device 21a configured to supply the air to a corresponding one of the indoor side heat exchangers 21 is provided.

The indoor side heat exchanger 21 acts as a radiator (a condenser) or an evaporator and is configured to condense and liquefy the refrigerant or to evaporate and gasify the refrigerant, by exchanging heat between the refrigerant supplied from the outdoor unit 10 and a heat medium (for example, another type of refrigerant, air, or water). When the refrigeration cycle apparatus 100 is used for an air-conditioning purpose, the indoor side heat exchanger 21 generates air-conditioned air by exchanging heat between the refrigerant and air.

The pressure reducing device 22 is configured to reduce the pressure of the refrigerant to expand the refrigerant. The pressure reducing device 22 may be composed of a device of which the opening degree can be variably controlled, such as, a precise flow rate controlling unit employing an electronic expansion valve and an inexpensive refrigerant flow rate adjusting unit including a capillary or another component.

<The Refrigerant Flow Divider 30>

The refrigerant flow divider 30 connects the indoor units 20 and the outdoor unit 10 to each other and has a function of dividing the flow of the refrigerant supplied from the outdoor unit 10 to each of the indoor units 20 in response to a request from each of the indoor units 20.

The refrigerant flow divider 30 includes at least a gas-liquid separator 31, a first distributing portion 32, a second distributing portion 33, an expansion device 34, and another expansion device 35.

The gas-liquid separator 31 is configured to separate the refrigerant into gas refrigerant and liquid refrigerant and is provided in the refrigerant pipe 4 in a position on the downstream side of the check valve 14a and the check valve 14. The one end of the gas-liquid separator 31 is connected to switching devices 32a of the first distributing portion 32 and the other end is connected to the expansion device 34.

The first distributing portion 32 includes the switching devices 32a of which the number corresponds to the number of the connected indoor units 20. The first distributing portion 32 has a function of causing the refrigerant to flow in and out of the indoor side heat exchanger 21 included in each of the indoor units 20.

In the second distributing portion 33, the refrigerant pipe 4 is separated into branches of which the number corresponds to the number of the connected indoor units 20, so that the refrigerant flows in response to the operations of the indoor side heat exchangers 21.

The expansion device 34 is provided on the liquid refrigerant outlet side of the gas-liquid separator 31 and is configured to reduce the pressure of the refrigerant to expand the refrigerant. The expansion device 34 may be composed of a device of which the opening degree can variably be controlled, for example, a precise flow rate controlling unit employing an electronic expansion valve or an inexpensive refrigerant flow rate adjusting unit including a capillary or another component.

The expansion device 35 is provided in the refrigerant pipe 4 branched from a position between the expansion device 34 and the second distributing portion 33. The expansion device 35 acts as a pressure reducing valve or an expansion valve and is configured to reduce the pressure of the refrigerant to expand the refrigerant. Similarly to the expansion device 34, the expansion device 35 may be composed of a device of which the opening degree can variably be controlled, for example, a precise flow rate controlling unit employing an electronic expansion valve or an inexpensive refrigerant flow rate adjusting unit including a capillary or another component.

As explained above, in the refrigeration cycle apparatus 100, the compressor 11, the four-way valve 12, and the water heat exchangers 50 are connected in series by the pipes. These components are connected by the pipes to the indoor side heat exchangers 21 via the refrigerant flow divider 3, to form the refrigerant circuit to circulate the refrigerant.

Further, in the refrigeration cycle apparatus 100, the water circuit connects the heat source device 1, the pumps 6, and the electric valves 7 in series by the pipes, to circulate the water.

Note that the compressor 11 is only required to be able to compress the sucked refrigerant into a high-pressure state, and the type of the compressor 11 is not particularly limited. For example, the compressor 11 may be composed of any type of device such as a reciprocating compressor, a rotary compressor, a scroll compressor, and a screw compressor. The compressor 11 may also be of a type of which the rotation speed can variably be controlled by an inverter or may be of a type of which the rotation speed is fixed.

Further, the type of the refrigerant circulated in the refrigeration cycle apparatus 100 is not particularly limited. For example, the refrigerant may be any of a natural refrigerant such as carbon dioxide ($CO_2$), hydrocarbon, and helium, an alternative refrigerant containing no chlorine such as HFC410A, HFC407C, and HFC404A, and fluorocarbon-based refrigerant used in existing products such as R22 and R134a.

Operations performed by the refrigeration cycle apparatus 100 in various operation modes will be explained.

The refrigeration cycle apparatus 100 is configured to perform cooling operation or heating operation in each of the indoor units 20 on the basis of an instruction from the respective indoor unit 20. In other words, the refrigeration cycle apparatus 100 is configured so that all of the indoor units 20 can perform the same operation as one another and so that each of the indoor units 20 can perform an operation different from the other indoor units 20.

The operation modes executed by the refrigeration cycle apparatus 100 include a cooling only operation mode in which all of the driven indoor units 20 perform a cooling operation, a heating only operation mode in which all of the driven indoor units 20 perform a heating operation, a cooling main operation mode that is one of the cooling and heating mixed operation modes and in which the cooling load is larger than the heating load, and a heating main operation mode that is another one of the cooling and heating mixed operation modes and in which the heating load is larger than the cooling load.

The operation modes of the refrigeration cycle apparatus 100 will be explained with reference to FIGS. 3 to 6. FIGS. 3 to 6 each schematically illustrate a part of the circuit configuration diagram in FIG. 2 to explain the flow of the refrigerant. Further, in FIGS. 3 to 6, the flows of the refrigerant arranged by the switching devices 32a are illustrated in solid black. Further, in FIGS. 3 to 6, indoor side heat exchangers 21 in which a cooling load is occurring are indicated with diagonal hatching, whereas indoor side heat exchangers 21 in which a heating load is occurring are indicated with shades, to facilitate distinction.

<The Cooling Only Operation Mode>

Figure 3:
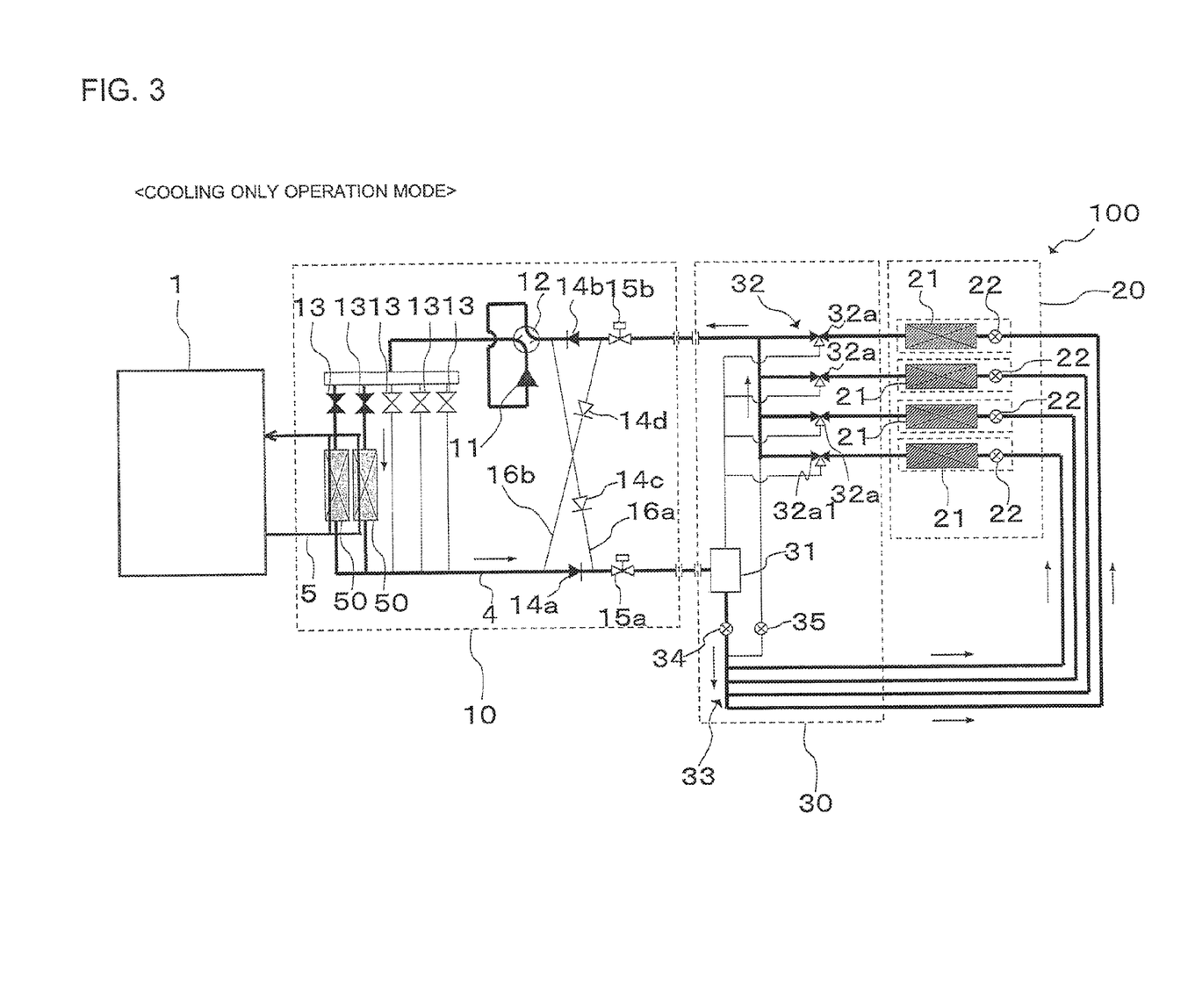
FIG. 3 is a refrigerant circuit diagram illustrating a flow of refrigerant while the refrigeration cycle apparatus according to the embodiment of the present invention is in a cooling only operation mode.

FIG. 3 is a refrigerant circuit diagram illustrating a flow of the refrigerant observed when the refrigeration cycle apparatus 100 is in the cooling only operation mode. In FIG. 3, the cooling only operation mode will be explained with reference to an example in which a cooling load is occurring in all of the indoor side heat exchangers 21. In FIG. 3, the pipes indicated with the bold lines are the pipes through which the refrigerant is flowing. Further, in FIG. 3, the flowing direction of the refrigerant is indicated with the solid arrows.

In the cooling only operation mode illustrated in FIG. 3, in the outdoor unit 10, the four-way valve 12 is switched so that the refrigerant discharged from the compressor 11 flows into the water heat exchangers 50.

In the refrigerant flow divider 30, the indoor side heat exchangers 21 and the four-way valve 12 are connected to each other by the switching devices 32a.

The refrigerant having a low temperature and low pressure is compressed by the compressor 11 and is discharged as gas refrigerant having a high temperature and high pressure. The gas refrigerant having a high temperature and high pressure discharged from the compressor 11 passes through the water heat exchangers 50 via the four-way valve 12, exchanges heat with outside air to become either liquid or two-phase refrigerant having a high temperature and high pressure, passes through the check valve 14a, and flows out of the outdoor unit 10. The liquid or two-phase refrigerant having a high temperature and high pressure and having flowed out of the outdoor unit 10 passes through the refrigerant pipe 4 and flows into the refrigerant flow divider 30.

The liquid or two-phase refrigerant having a high temperature and high pressure and having flowed into the refrigerant flow divider 30 passes through the gas-liquid separator 31, and is expanded by the pressure reducing devices 22 in the indoor units 20 to become two-phase refrigerant having a low temperature and low pressure. Each of the flows of the two-phase refrigerant flows into a corresponding one of the indoor side heat exchangers 21, is evaporated and gasified while absorbing heat from the heat medium such as air supplied to the indoor side heat exchanger 21, and becomes gas refrigerant having a low temperature. At this time, the indoor units 20 perform a cooling operation on the air-conditioned space. The gas refrigerant having flowed out of the indoor side heat exchangers 21 passes through the switching devices 32a, flows out of the refrigerant flow divider 30, is guided through the refrigerant pipe 4, and passes through the check valve 14b, and is sucked into the compressor 11 again via the four-way valve 12.

<The Heating Only Operation Mode>

Figure 4:
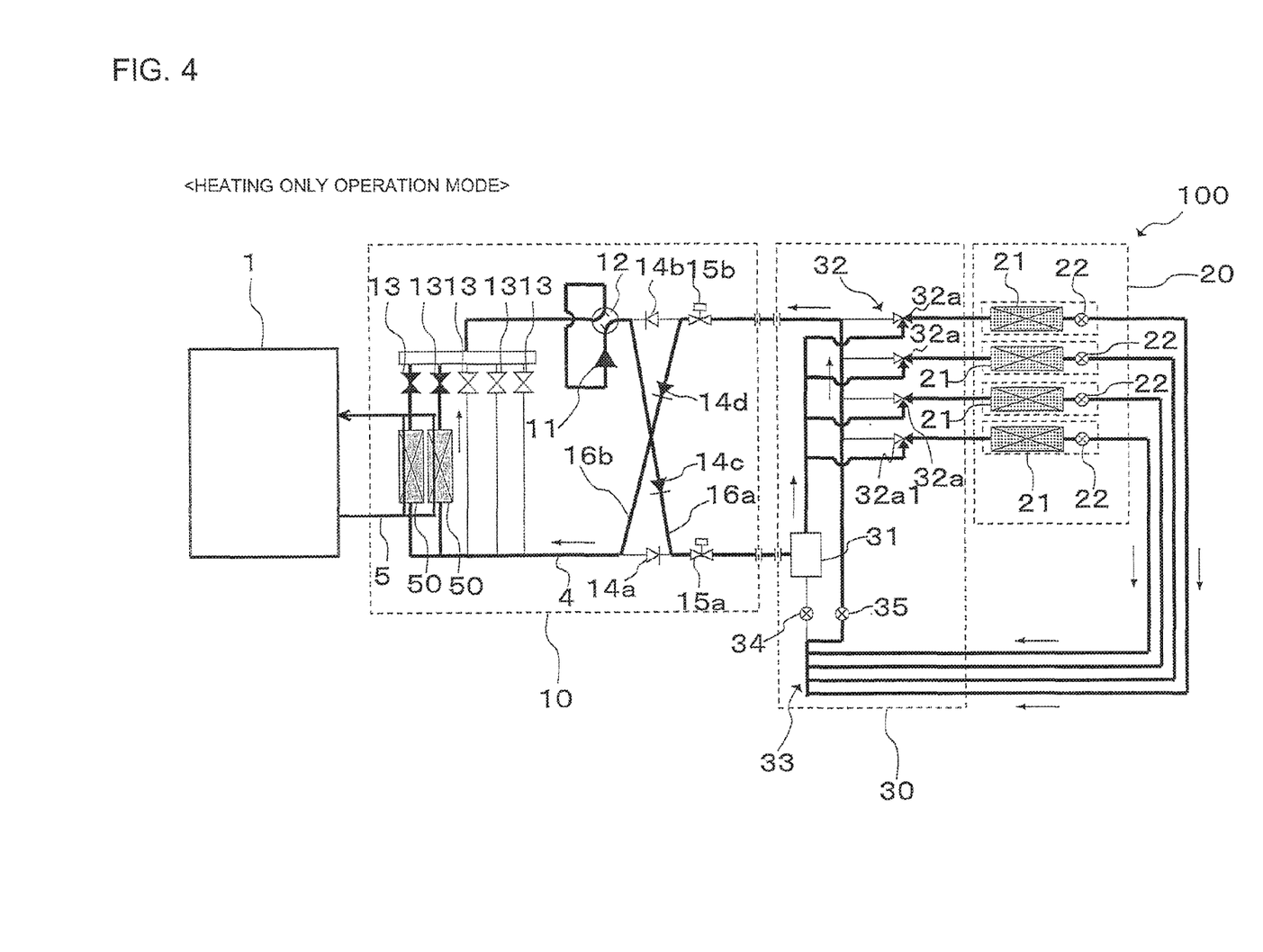
FIG. 4 is a refrigerant circuit diagram illustrating a flow of the refrigerant while the refrigeration cycle apparatus according to the embodiment of the present invention is in a heating only operation mode.

FIG. 4 is a refrigerant circuit diagram illustrating a flow of the refrigerant observed when the refrigeration cycle apparatus 100 is in the heating only operation mode. In FIG. 4, the heating only operation mode will be explained with reference to an example in which a heating load is occurring in all of the indoor side heat exchangers 21. In FIG. 4, the pipes indicated with the bold lines are the pipes through which the refrigerant is flowing. Further, in FIG. 4, the flowing direction of the refrigerant is indicated with the solid arrows.

In the heating only operation mode illustrated in FIG. 4, in the outdoor unit 10, the four-way valve 12 is switched so that the refrigerant discharged from the compressor 11 flows into the refrigerant flow divider 30.

In the refrigerant flow divider 30, the gas-liquid separator 31 and the indoor side heat exchangers 21 are connected to each other by the switching devices 32a.

The refrigerant having a low temperature and low pressure is compressed by the compressor 11 and is discharged as gas refrigerant having a high temperature and high pressure. The gas refrigerant having a high temperature and high pressure discharged from the compressor 11 passes through the check valve 14c via the four-way valve 12, and flows out of the outdoor unit 10. The gas refrigerant having a high temperature and high pressure and having flowed out of the outdoor unit 10 passes through the refrigerant pipe 4, and flows into the refrigerant flow divider 30. The gas refrigerant having a high temperature and high pressure and having flowed into the refrigerant flow divider 30 passes through the gas-liquid separator 31, and passes through the switching devices 32a to flow into each of the indoor side heat exchangers 21.

The gas refrigerant having a high temperature and high pressure and having flowed into the indoor side heat exchangers 21 is condensed and liquified while radiating heat into the heat medium such as air supplied to the indoor side heat exchangers 21 and becomes liquid refrigerant having high pressure. At this time, the indoor units 20 perform a heating operation on the air-conditioned space. The liquid refrigerant having flowed out of the indoor side heat exchangers 21 is expanded by the pressure reducing devices 22 in the indoor units 20 to become two-phase refrigerant having a low temperature and low pressure. The two-phase refrigerant passes through the expansion device 35, flows out of the refrigerant flow divider 30, and passes through the refrigerant pipe 4 to flow into the outdoor unit 10 again. The refrigerant having flowed into the outdoor unit 10 passes through the check valve 14d and flows into the water heat exchangers 50 acting as evaporators.

Then, the refrigerant having flowed into the water heat exchangers 50 absorbs heat from the water in the water heat exchangers 50 to become gas refrigerant having a low temperature and low pressure. The gas refrigerant having a low temperature and low pressure and having flowed out of the water heat exchangers 50 is sucked into the compressor 11 again via the four-way valve 12.

<The Cooling Main Operation Mode>

Figure 5:
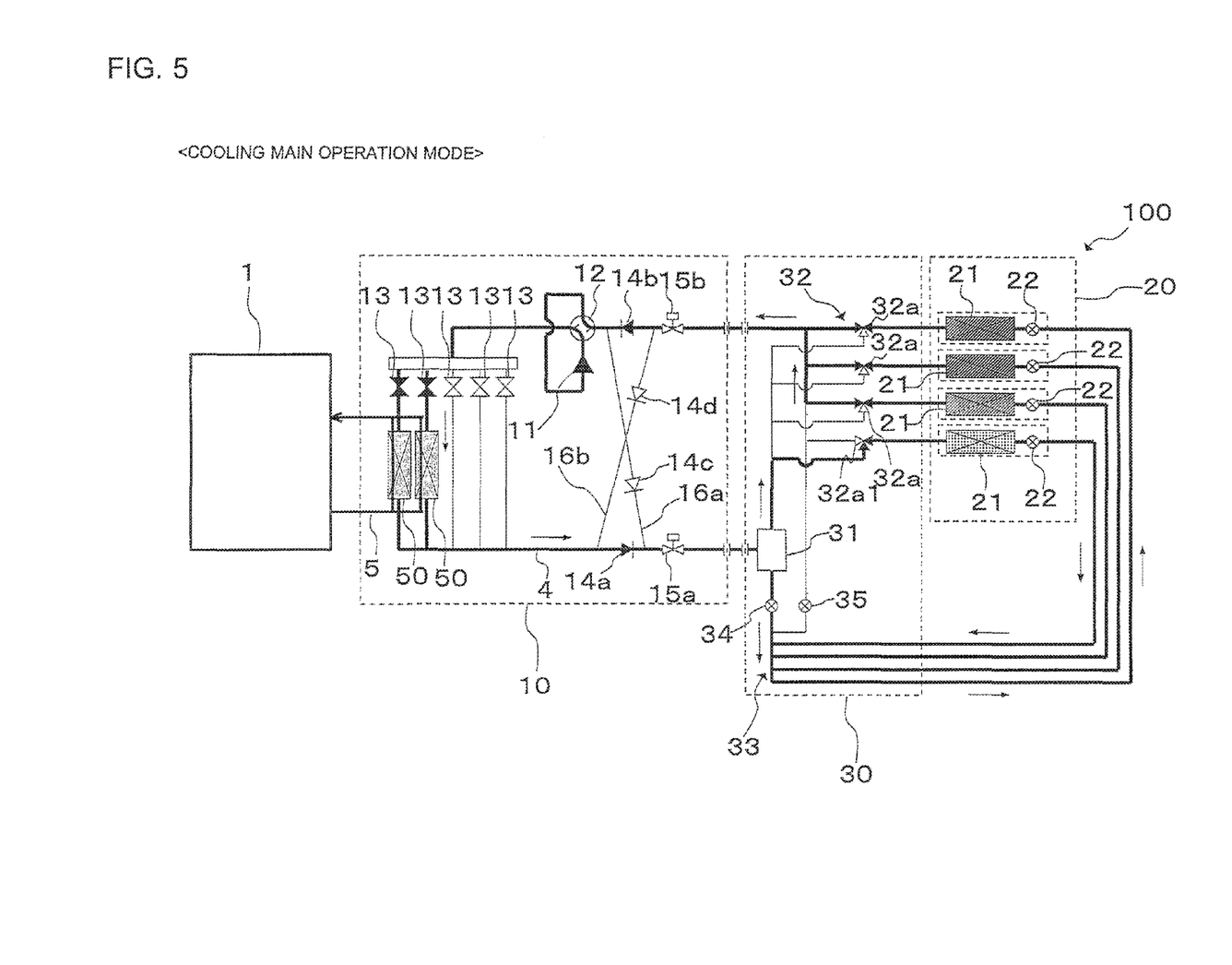
FIG. 5 is a refrigerant circuit diagram illustrating a flow of the refrigerant while the refrigeration cycle apparatus according to the embodiment of the present invention is in a cooling main operation mode.

FIG. 5 is a refrigerant circuit diagram illustrating a flow of the refrigerant observed when the refrigeration cycle apparatus 100 is in the cooling main operation mode. In FIG. 5, the cooling main operation mode will be explained with reference to an example in which a heating load is occurring in one of the indoor side heat exchangers 21 positioned at the bottom on the drawing page, whereas a cooling load is occurring in the other indoor side heat exchangers 21. In FIG. 5, the pipes indicated with the bold lines are the pipes through which the refrigerant is flowing. Further, in FIG. 5, the flowing direction of the refrigerant is indicated with the solid arrows.

In the cooling main operation mode illustrated in FIG. 5, in the outdoor unit 10, the four-way valve 12 is switched so that the refrigerant discharged from the compressor 11 flows into the water heat exchangers 50.

In the refrigerant flow divider 30, the one of the switching devices 32a corresponding to the one of the indoor side heat exchangers 21 positioned at the bottom on the drawing page is switched so that the gas-liquid separator 31 is connected to the indoor side heat exchanger 21, and the other switching devices 32a are switched so that the other indoor side heat exchangers 21 are connected to the four-way valve 12.

The refrigerant having a low temperature and low pressure is compressed by the compressor 11 and is discharged as gas refrigerant having a high temperature and high pressure. The gas refrigerant having a high temperature and high pressure discharged from the compressor 11 passes through the water heat exchangers 50 via the four-way valve 12, exchanges heat with outside air to become two-phase refrigerant having a high temperature and high pressure, passes through the check valve 14a, and flows out of the outdoor unit 10. The two-phase refrigerant having a high temperature and high pressure and having flowed out of the outdoor unit 10 passes through the refrigerant pipe 4 and flows into the refrigerant flow divider 30.

The two-phase refrigerant having a high temperature and high pressure and having flowed into the refrigerant flow divider 30 is separated into gas and liquid by the gas-liquid separator 31, and the gas refrigerant flows into the one of the indoor side heat exchangers 21 positioned at the bottom on the drawing page, via the one of the switching devices 32a positioned at the bottom on the drawing page. The gas refrigerant having a high temperature and high pressure and having flowed into the indoor side heat exchanger 21 is condensed and liquified while radiating heat into the heat medium such as air supplied to the indoor side heat exchanger 21 and becomes liquid refrigerant having high pressure. At this time, the indoor unit 20 performs a heating operation on the air-conditioned space. The liquid refrigerant having flowed out of the indoor side heat exchanger 21 is routed through the pressure reducing device 22 in the indoor unit 20 and joins the liquid refrigerant having flowed out of the refrigerant flow divider 30, on the downstream side of the expansion device 34.

In contrast, the liquid refrigerant resulting from the gas-liquid separation performed by the gas-liquid separator 31 is routed through the expansion device 34 and joins the refrigerant flowing from the one of the indoor side heat exchangers 21 positioned at the bottom on the drawing page, and flows into the other indoor units 20 than the indoor unit 20 positioned at the bottom on the drawing page. Then, the joined refrigerant is expanded by the pressure reducing device 22 in each of the other indoor units 20 and becomes two-phase refrigerant having a low temperature and low pressure. Each of these flows of two-phase refrigerant flows into a corresponding one of the indoor side heat exchangers 21, is evaporated and gasified while absorbing heat from the heat medium such as air supplied to the indoor side heat exchangers 21, and become gas refrigerant having a low temperature. At this time, the indoor units 20 perform a cooling operation on the air-conditioned space.

The gas refrigerant having flowed out of the indoor side heat exchangers 21 passes through the switching devices 32a, flows out of the refrigerant flow divider 30, is guided through the refrigerant pipe 4, passes through the check valve 14b, and is sucked into the compressor 11 again via the four-way valve 12.

Figure 6:
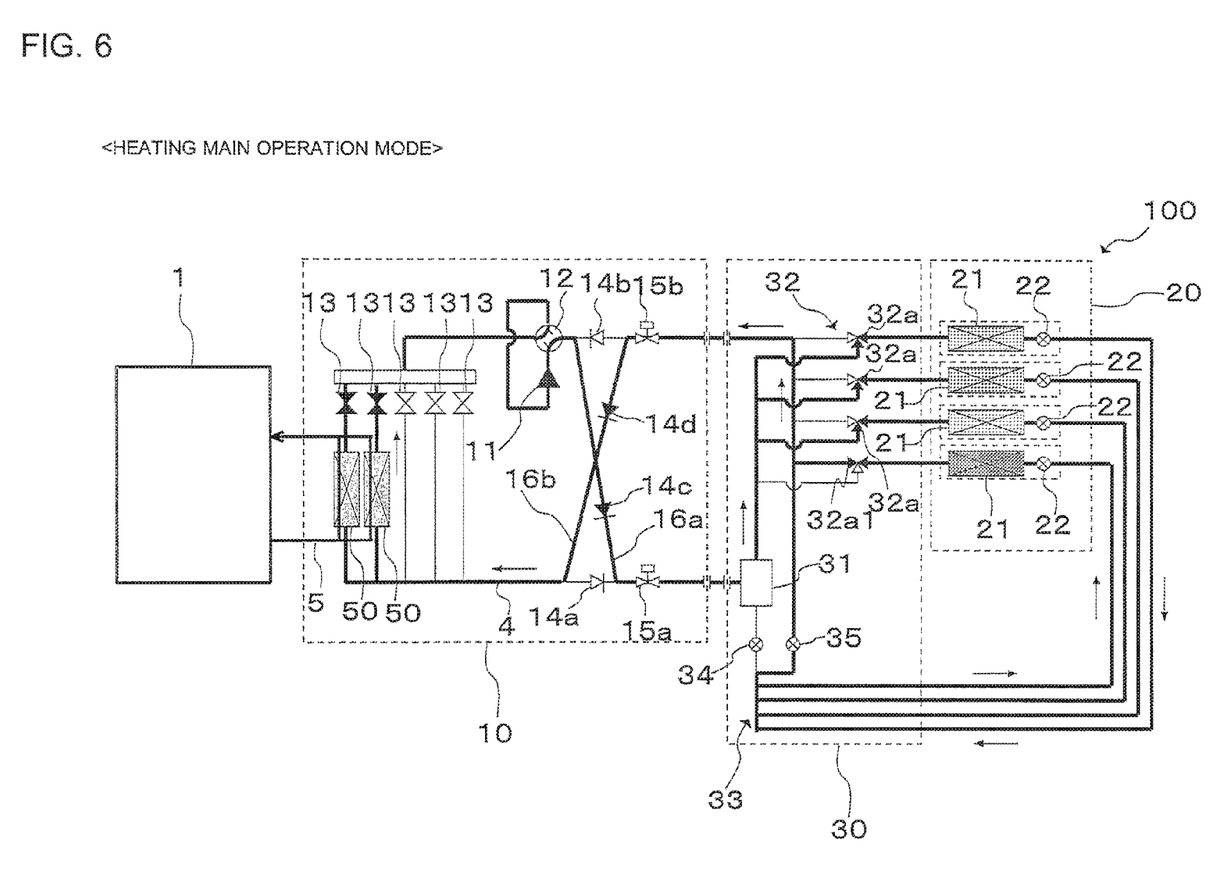
FIG. 6 is a refrigerant circuit diagram illustrating a flow of the refrigerant while the refrigeration cycle apparatus according to the embodiment of the present invention is in a heating main operation mode.

FIG. 6 is a refrigerant circuit diagram illustrating a flow of the refrigerant observed when the refrigeration cycle apparatus 100 is in the heating main operation mode. In FIG. 6, the heating main operation mode will be explained with reference to an example in which a cooling load is occurring in one of the indoor side heat exchangers 21 positioned at the bottom on the drawing page, whereas a heating load is occurring in the other indoor side heat exchangers 21. In FIG. 6, the pipes indicated with the bold lines are the pipes through which the refrigerant is flowing. Further, in FIG. 6, the flowing direction of the refrigerant is indicated with the solid arrows.

In the heating main operation mode illustrated in FIG. 6, in the outdoor unit 10, the four-way valve 12 is switched so that the refrigerant discharged from the compressor 11 flows into the refrigerant flow divider 30.

In the refrigerant flow divider 30, the one of the switching devices 32a corresponding to the one of the indoor side heat exchangers 21 positioned at the bottom on the drawing page is switched so that the indoor side heat exchanger 21 is connected to the four-way valve 12, and the other switching devices 32a are switched so that the gas-liquid separator 31 is connected to the other indoor side heat exchangers 21.

The refrigerant having a low temperature and low pressure is compressed by the compressor 11 and is discharged as gas refrigerant having a high temperature and high pressure. The gas refrigerant having a high temperature and high pressure discharged from the compressor 11 passes through the check valve 14c via the four-way valve 12 and flows out of the outdoor unit 10. The gas refrigerant having a high temperature and high pressure and having flowed out of the outdoor unit 10 passes through the refrigerant pipe 4 and flows into the refrigerant flow divider 30.

The gas refrigerant having a high temperature and high pressure and having flowed into the refrigerant flow divider 30 is routed through the gas-liquid separator 31 and flows into the other indoor side heat exchangers 21 than the indoor side heat exchanger 21 positioned at the bottom on the drawing page, via the switching devices 32a corresponding to the other indoor side heat exchangers 21. The gas refrigerant having a high temperature and high pressure and having flowed into the indoor side heat exchangers 21 is condensed and liquified while radiating heat into the heat medium such as air supplied to the indoor side heat exchangers 21 and becomes liquid refrigerant having high pressure. At this time, the indoor units 20 perform a heating operation on the air-conditioned space. The liquid refrigerant having flowed out of the indoor side heat exchangers 21 is routed through the pressure reducing devices 22 in the indoor units 20 and joins the flow, on the downstream side of the pressure reducing devices 22.

The joined flow of liquid refrigerant flows into the one of the indoor side heat exchangers 21 positioned at the bottom on the drawing page. The liquid refrigerant is evaporated and gasified while absorbing heat from the heat medium such as air supplied to the indoor side heat exchanger 21 and becomes gas refrigerant having a low temperature. At this time, the indoor unit 20 performs a cooling operation on the air-conditioned space.

The gas refrigerant having flowed out of the indoor side heat exchanger 21 passes through the one of the switching devices 32a positioned at the bottom on the drawing page, flows out of the refrigerant flow divider 30, is guided through the refrigerant pipe 4, passes through the check valve 14b, and is sucked into the compressor 11 again via the four-way valve 12.

As explained above, the refrigeration cycle apparatus 100 includes the water-cooled refrigerant circuit capable of the simultaneous cooling and heating operation. In other words, the refrigeration cycle apparatus 100 includes the water heat exchangers 50 as the heat source side heat exchangers, so that each of the plurality of indoor units 20 can selectively perform one of the heating and the cooling operations. The reason for adopting the water heat exchangers 50 as the heat source side heat exchangers is explained as below.

First of all, because fluctuations of the water temperature in relation to the outside air temperature are small, the capability of a water-cooled heat exchanger caused by the outside air temperature is smaller than that of an air-cooled heat exchanger. The water-cooled heat exchanger is therefore more advantageous than the air-cooled heat exchanger, especially in locations where the outside air temperature is low.

Secondly, during winter periods, an air-cooled heat exchanger requires defrosting operation to remove frost from the heat exchangers, and thus the room temperature drops for a certain period of time because the heating operation needs to be stopped. In contrast, the water-cooled heat exchanger does not require the defrosting operation, and therefore the room temperature can be constant at all times.

Thirdly, when two or more outdoor units 10 are installed, the heat discharged from any of the outdoor units 10 can be used in the other outdoor units 10 via the water. The energy-saving performance is therefore enhanced compared to an air-cooled heat exchanger.

<Specific Controlling Processes and Advantageous Effects of the Refrigeration Cycle Apparatus 100>

Figure 7:
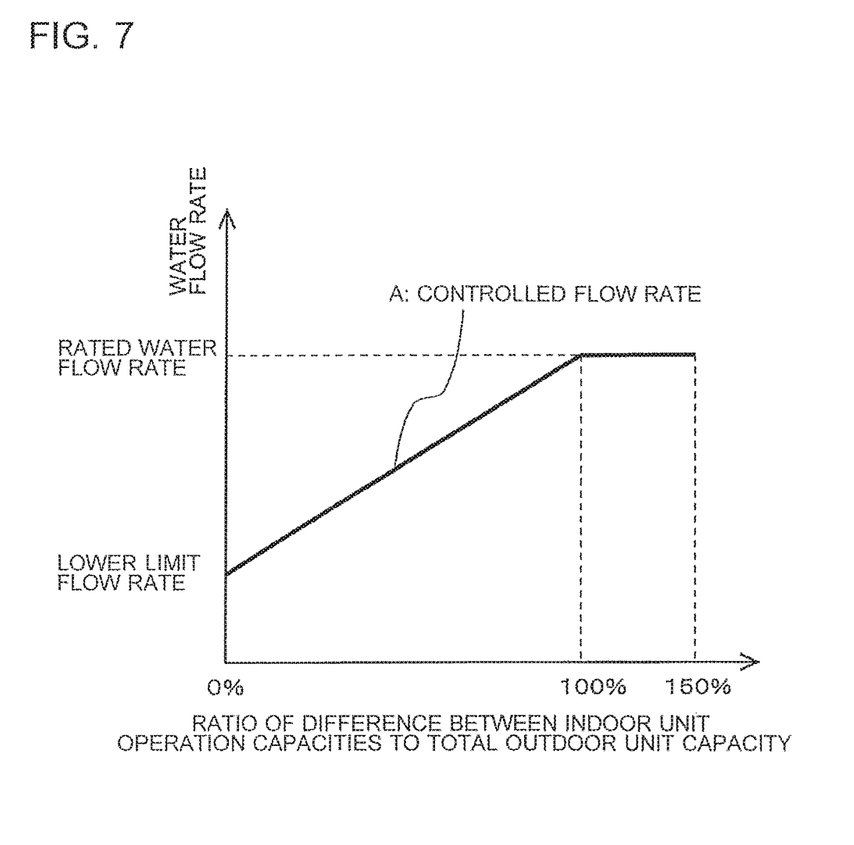
FIG. 7 is a chart conceptually illustrating a water flow rate adjustment in the refrigeration cycle apparatus according to the embodiment of the present invention.

The refrigeration cycle apparatus 100 is configured to reduce the power of the pumps 6 and to improve the energy-saving performance, by adjusting the flow rate of the circulating water to the water heat exchangers 50 depending on the loads on the use side. FIG. 7 is a chart conceptually illustrating a water flow rate adjustment in the refrigeration cycle apparatus 100. In FIG. 7, the vertical axis expresses the water flow rate, whereas the horizontal axis expresses the ratio (%) of the difference between the indoor unit operation capacities to the outdoor unit operation capacity.

In the refrigeration cycle apparatus 100, the operation capacities of the indoor units 20 (the indoor side heat exchangers 21) and the operation capacity of the outdoor unit 10 (the water heat exchangers 50) are detected to adjust the flow rate of the circulating water to the water heat exchangers 50 so that the flow rate is equal to a value obtained by multiplying, by the rated water flow rate of the pump 6 corresponding to the water heat exchanger 50 in operation, a ratio of the absolute value of the difference between the total cooling operation capacity of the indoor units and the total heating operation capacity of the indoor units, to the total operation capacity of the outdoor unit (see Formula 1 below). In a commonly-used refrigeration cycle apparatus including a water heat exchanger, because the water flow rate is not adjusted, water keeps being supplied to the water heat exchanger in an amount equal to the rated water flow rate of the pump 6. In contrast, as indicated with line A in FIG. 7, the refrigeration cycle apparatus 100 is configured to be able to adjust the flow rate of the circulating water to the water heat exchanger 50.

$$GW = Gwr \times N \times \left( \alpha \times \frac{|\sum Qjc - \sum Qjh|}{\sum Qjo} \right) \quad \text{[Formula 1]}$$

$$Gwo = Gw/n$$

Gw: the total water flow rate of the system
Gwr: the rated water flow rate
Gwo: the water flow rate of each outdoor unit
$\Sigma Qjc$: the total cooling operation capacity of the indoor units
$\Sigma Qjh$: the total heating operation capacity of the indoor units
$\Sigma Qjo$: the total operation capacity of the outdoor unit
N: the number of the connected outdoor units
n: the number of the outdoor units in operation (where the compressor operation frequency >0)

When the pump 6 is configured of a pump of which rotation speed is controllable, the flow rate of circulating water to the water heat exchanger 50 is preferred to be adjusted by adjusting the rotation speed of the pump 6. On the contrary, when the pump 6 is not configured of a pump of which rotation speed is controllable, the flow rate of the circulating water to the water heat exchanger 50 is preferred to be adjusted by controlling the opening degree of the electric valve 7. When the water flow rate can be adjusted by adjusting the pump 6, the electric valve 7 does not necessarily have to be provided.

When the controller 10a determines that the water flow rate has reached the lower limit value, the controller 10a tries to further improve the energy-saving performance, by adjusting the heat transfer area of the water heat exchangers 50. For example, when the rotation speed of the pump 6 corresponding to the water heat exchangers 50 has reached the lowest rotation speed, the controller 10a may determine that the water flow rate has reached the lower limit value and may reduce the heat transfer area of the water heat exchangers 50. In other words, while the water heat exchangers 50 are acting as condensers, the controller 10a may lower the condensing temperature of the water heat exchangers 50 by adjusting the heat transfer area. On the contrary, while the water heat exchangers 50 are acting as evaporators, the controller 10a may lower the evaporating temperature of the water heat exchangers 50 by adjusting the heat transfer area.

The heat transfer area of the water heat exchangers 50 can be adjusted by opening and closing the solenoid valves 13. For example, as illustrated in FIG. 2, the heat transfer area of the water heat exchangers 50 can be adjusted by providing the plurality of water heat exchangers 50, providing the bypass pipes 4a to bypass the water heat exchangers 50, installing the solenoid valve 13 in each of the bypass pipes 4a, and adjusting the flows of the refrigerant by exercising opening and closing control on the solenoid valves 13. Further, when the water heat exchangers 50 are composed of plate-type heat exchangers, the heat transfer area of the water heat exchangers 50 may be adjusted by connecting a plurality of paths to the plate-type heat exchangers and guiding the refrigerant to the paths. In this case, the solenoid valve 13 may be provided in each of the plurality of paths.

Further, when the heat transfer area of the water heat exchangers 50 is adjusted on the refrigerant side, the compressor 11 accordingly operates at an appropriate compressing ratio. Thus, the compressor 11 can be prevented from operating with a low capacity and at a low compressing ratio, reducing occurrence of failures in the compressor 11. Further, because the compressor 11 operates at the appropriate compressing ratio, further contributing to the improvement of the energy-saving performance.

In other words, the refrigeration cycle apparatus 100 is configured to improve the energy-saving performance of the heat source device 1 by, at first, reducing the power of the pumps 6 on the water side, depending on the operation capacity of the indoor units 20 and the operation capacity of the outdoor unit 10. More specifically, as explained later, by setting the water flow rate on the basis of the difference in the operation capacities between the cooling operation and the heating operation of the indoor units 20, the refrigeration cycle apparatus 100 can arrange a required minimum amount of water to flow to the water heat exchangers 50 of the outdoor unit 10, even while the simultaneous cooling and heating operation is performed. Consequently, the power of the pumps 6 can be reduced. Further, when this arrangement is not sufficient, by adjusting the heat transfer area of the water heat exchangers 50 on the refrigerant side, the circulation amount of the refrigerant can be reduced, also on the outdoor unit 10 side to improve the energy-saving performance.

Figure 8:
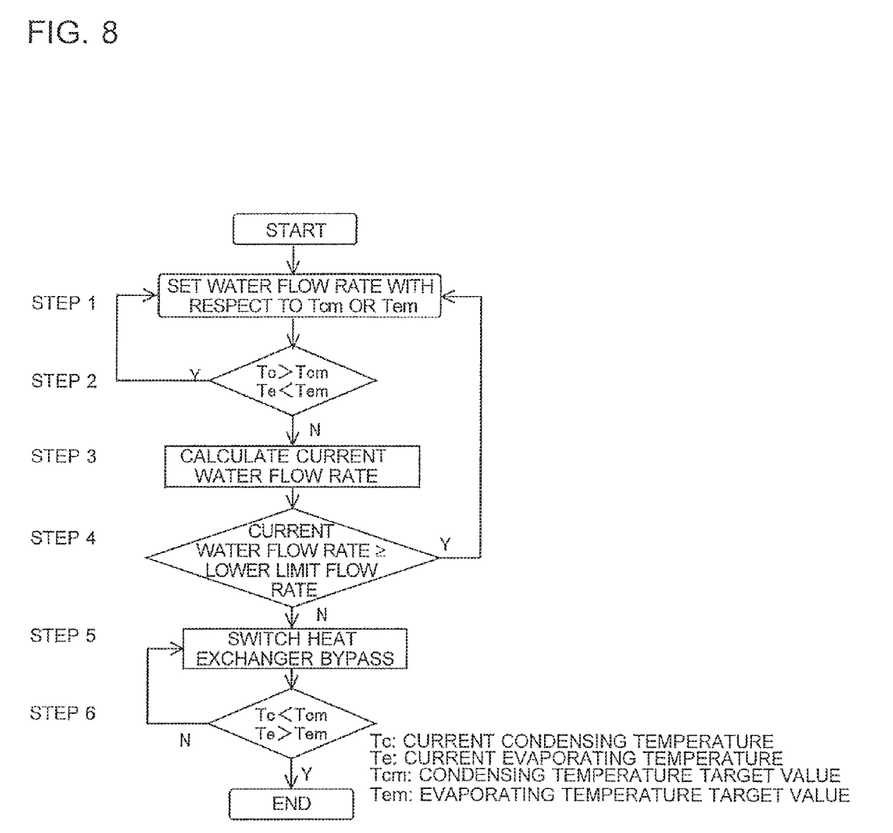
FIG. 8 is a flowchart illustrating an example of a controlling process performed by the refrigeration cycle apparatus according to the embodiment of the present invention.

FIG. 8 is a flowchart of an example of a controlling process performed by the refrigeration cycle apparatus 100. With reference to FIG. 8, the example of the controlling process performed by the refrigeration cycle apparatus 100 will specifically be explained.

<STEP 1>

The controller 10a sets a flow rate of the water flowing to the water heat exchangers 50, with respect a target condensing temperature Tcm (or a target evaporating temperature Tem) of the water heat exchangers 50. The target condensing temperature Tcm may be referred to as a condensing temperature target value Tcm. Further, the target evaporating temperature Tem may be referred to as an evaporating temperature target value Tem.

<STEP 2>

The controller 10a determines whether the current condensing temperature Tc is higher than the target condensing temperature Tcm (or determines whether the current evaporating temperature Te is lower than the target evaporating temperature Tem).

When the controller 10a has determined that the current condensing temperature Tc is higher than the target condensing temperature Tcm (or that the current evaporating temperature Te is lower than the target evaporating temperature Tem), the controller 10a returns to STEP 1.

On the contrary, when the controller 10a has determined that the current condensing temperature Tc is equal to or lower than the target condensing temperature Tcm (or that the current evaporating temperature Te is equal to or higher than the target evaporating temperature Tem), the controller 10a proceeds to STEP 3.

<STEP 3>

The controller 10a obtains, through a calculation, the current flow rate of the water flowing to the water heat exchangers 50. When a flowmeter (a flow rate detecting unit) is installed, the controller 10a calculates the current flow rate of the water flowing to the water heat exchangers 50, on the basis of measurement information obtained from the flowmeter.

The water flow rate during a heating operation:

$Qre=Gr \times (hs-hei)$ $Qw=Gw \times Cp \times (Two-Twi)$      [Formula 2]

Because Qre equals Qw, $Gw=Gr \times (hs-hei)/(Cp \times (Two-Twi))$

The water flow rate during a cooling operation:

$Qrc=Gr \times (hd-hcl)$ $Qw=Gw \times Cp \times (Two-Twi)$      [Formula 3]

Because Qrc equals Qw, $Gw=Gr \times (hd-hcl)/(Cp \times (Two-Twi))$

In the formulae above, Cp denotes the specific heat, Gw denotes the water flow rate, Two denotes the water heat exchanger outlet temperature, Twi denotes the water heat exchanger inlet temperature, Qw denotes the water-side capability, Qre denotes the refrigerant-side evaporating capability, Qrc denotes the refrigerant-side condensing capability, hs denotes a suction enthalpy (calculated from suction pressure and suction temperature), hei denotes an evaporator inlet liquid enthalpy (hei=hcl), hd denotes a discharge enthalpy (calculated from discharge pressure and discharge temperature), hcl denotes a water heat exchanger outlet saturated liquid enthalpy (calculated from discharge pressure), and Gr denotes the refrigerant flow rate (calculated from a compressor performance value and a suction density value (stored in a control substrate as a function of the suction pressure and the suction temperature)).

<STEP 4>

The controller 10a determines whether the current flow rate of the water flowing to the water heat exchangers 50 is equal to or higher than the lower limit flow rate adjustable by either the pump 6 or the electric valve 7.

When the controller 10a determines that the current flow rate of the water flowing to the water heat exchangers 50 is equal to or higher than the lower limit flow rate adjustable by either the pump 6 or the electric valve 7, the controller 10a returns to STEP 1 to set the water flow rate again.

On the contrary, when the controller 10a determines that the current flow rate of the water flowing to the water heat exchangers 50 is not equal to or higher than the lower limit flow rate adjustable either by the pump 6 or the electric valve 7, the controller 10a proceeds to STEP 5.

<STEP 5>

The controller 10a reduces the heat transfer area used by the water heat exchangers 60. The ratio by which the heat transfer area is reduced may be determined depending on the difference between the current condensing temperature Tc and the target condensing temperature Tcm (or the difference between the current evaporating temperature Te and the target evaporating temperature Tem).

<STEP 6>

The controller 10a determines again whether the current condensing temperature Tc is lower than the target condensing temperature Tcm (or whether the current evaporating temperature Te is higher than the target evaporating temperature Tem).

When the controller 10a determines that the current condensing temperature Tc is lower than the target condensing temperature Tcm (or that the current evaporating temperature Te is higher than the target evaporating temperature Tem), the controller 10a returns to STEP 5.

On the contrary, when the controller 10a determines that the current condensing temperature Tc is equal to or higher than the target condensing temperature Tcm (or that the current evaporating temperature Te is equal to or lower than the target evaporating temperature Tem), the controller 10a ends the controlling process.

As explained above, by using the refrigeration cycle apparatus 100, the energy-saving performance of the heat source device 1 can be improved, by reducing the power of the pump 6, depending on the operating capacities of the indoor units 20 and the operation capacity of the outdoor unit 10. Further, by using the refrigeration cycle apparatus 100, the energy-saving performance can be improve when the adjustment made through the water capacity on the water side alone is not sufficient, because the refrigerant circulation amount can also be reduced by adjusting the heat transfer area of the water heat exchangers 50 on the refrigerant side.

The type of the refrigerant used in the refrigeration cycle apparatus 100 is not particularly limited. As the refrigerant to be circulated in the refrigerant circuit in the refrigeration cycle apparatus 100, any of the following can be used, for example, a natural refrigerant such as carbon dioxide ($CO_2$), hydrocarbon, and helium, a refrigerant containing no chlorine such as alternative refrigerant including not only R410A, but also R407C and R404A, and a combustible refrigerant such as R32, HFO-1234yf, HFO-1234ze, HFO-1123, R290 ($C_3H_8$: propane), and R1270 ($C_3H_6$: propylene).

Further, in the embodiment described above, the explained example is that the refrigerant circuit includes the four-way valve 2 switchable between the heating operation and the cooling operation; however, the present invention is not limited to this example. For example, as an alternative to the four-way valve 2, the refrigerant circuit may include a plurality of two- or three-way valves to be capable of switching the flow of the refrigerant as similarly to the refrigerant circuit including the four-way valve 2.

Further, the refrigeration cycle apparatus 100 described in the present embodiment is applicable to use in any other apparatus that includes a refrigeration cycle, such as an air-conditioning apparatus (for example, a refrigerating apparatus, a room air-conditioning apparatus, a packaged air-conditioning apparatus, a multi-air-conditioning apparatus for a building) and a heat-pump hot water supply machine.

REFERENCE SIGNS LIST 1 heat source device 2 four-way valve 3 refrigerant flow divider 4 refrigerant pipe 4a bypass pipe 5 water pipe 6 pump 7 electric valve 8 pressure sensor 10 outdoor unit 10a controller 11 compressor 12 four-way valve 13 solenoid valve 14 check valve 14a check valve 14b check valve 14c check valve 14d check valve 15a stop valve 15b stop valve 16a first connecting pipe 16b second connecting pipe 20 indoor unit 21 indoor side heat exchanger 22 pressure reducing device 30 refrigerant flow divider 31 gas-liquid separator 32 first distributing portion 32a switching device 33 second distributing portion 34 expansion device 35 expansion device 50 water heat exchanger 60 water heat exchanger 100 refrigeration cycle apparatus

The invention claimed is:

1. A refrigeration cycle apparatus comprising:
a refrigerant circuit connecting a compressor, a water heat exchanger, a plurality of pressure reducing devices, and a plurality of use-side heat exchangers;
a water circuit connecting a pump; and
a controller controlling a rotation speed of the pump,
each of the plurality of use-side heat exchangers being configured to perform heating operation or cooling operation,
wherein the controller is configured to control a flow rate of circulating water to the water heat exchanger so as to be a value obtained by multiplying, by a rated water flow rate of the pump corresponding to the water heat exchanger, a ratio of an absolute value of a difference between a total operation capacity of each of the use-side heat exchangers executing the heating operation and a total operation capacity of each of the use-side heat exchangers executing the cooling operation to a total operation capacity of the water heat exchanger.

2. The refrigeration cycle apparatus of claim 1, wherein the controller is further configured to control the flow rate of the circulating water to the water heat exchanger by adjusting the rotation speed of the pump.

3. The refrigeration cycle apparatus of claim 1, further comprising an electric valve configured to adjust the flow rate of the circulating water to the water heat exchanger, wherein the controller is further configured to control the electric valve to adjust the flow rate of the circulating water to the water heat exchanger by adjusting an opening degree of the electric valve.

4. The refrigeration cycle apparatus of claim 1, wherein the controller is further configured to reduce a heat transfer area of the water heat exchanger when the flow rate of the circulating water to the water heat exchanger reaches a lower limit value.

5. The refrigeration cycle apparatus of claim 4, further comprising a plurality of solenoid valves provided between the compressor and the water heat exchanger, wherein the controller is further configured to adjust the heat transfer area of the water heat exchanger by causing the plurality of solenoid valves to adjust a flow of refrigerant.

6. The refrigeration cycle apparatus of claim 1, wherein the flow rate of circulating water to the water heat exchanger is a flow rate during simultaneous operation of the cooling operation and the heating operation.

7. A refrigeration cycle apparatus comprising:
a refrigerant circuit connecting a compressor, a water heat exchanger, a plurality of pressure reducing devices, and a plurality of use-side heat exchangers;
a water circuit connecting a pump; and
a controlling means configured to control a flow rate of circulating water to the water heat exchanger to be a value obtained by multiplying, by a rated water flow rate of the pump corresponding to the water heat exchanger, a ratio of an absolute value of a difference between a total operation capacity of each of the use-side heat exchangers executing the heating operation and a total operation capacity of each of the use-side heat exchangers executing the cooling operation to a total operation capacity of the water heat exchanger,
wherein each of the plurality of use-side heat exchangers is configured to perform a heating operation or a cooling operation.

8. The refrigeration cycle apparatus of claim 7, wherein the controlling means is further configured to control the flow rate of the circulating water to the water heat exchanger by adjusting a rotation speed of the pump.

9. The refrigeration cycle apparatus of claim 7, further comprising an electric valve configured to adjust the flow rate of the circulating water to the water heat exchanger, wherein the controlling means is further configured to control the electric valve to adjust the flow rate of the circulating water to the water heat exchanger by adjusting an opening degree of the electric valve.

10. The refrigeration cycle apparatus of claim 7, wherein the controlling means is further configured to reduce a heat transfer area of the water heat exchanger when the flow rate of the circulating water to the water heat exchanger reaches a lower limit value.

11. The refrigeration cycle apparatus of claim 10,
further comprising a plurality of solenoid valves provided between the compressor and the water heat exchanger,
wherein the controlling means is further configured to adjust the heat transfer area of the water heat exchanger by causing the plurality of solenoid valves to adjust a flow of refrigerant.

12. The refrigeration cycle apparatus of claim 7, wherein the flow rate of circulating water to the water heat exchanger is a flow rate during simultaneous operation of the cooling operation and the heating operation.

* * * * *